United States Patent
Cramer et al.

(10) Patent No.: US 9,457,662 B2
(45) Date of Patent: Oct. 4, 2016

(54) PRESENTING A DYNAMIC RANGE BASED ON AN OPERATING PARAMETER OF A VEHICLE

(71) Applicants: Dale O. Cramer, Royal Oak, MI (US); Michael Dean Tschirhart, Ann Arbor, MI (US)

(72) Inventors: Dale O. Cramer, Royal Oak, MI (US); Michael Dean Tschirhart, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/327,230

(22) Filed: Jul. 9, 2014

(65) Prior Publication Data

US 2016/0009176 A1   Jan. 14, 2016

(51) Int. Cl.
| | |
|---|---|
| *B60K 35/00* | (2006.01) |
| *B60Q 1/00* | (2006.01) |
| *B60T 8/32* | (2006.01) |
| *G01C 21/00* | (2006.01) |
| *B60K 31/00* | (2006.01) |
| *B60K 31/04* | (2006.01) |
| *B60K 31/18* | (2006.01) |
| *B60K 37/06* | (2006.01) |
| *B60Q 1/26* | (2006.01) |
| *F16H 63/00* | (2006.01) |

(52) U.S. Cl.
CPC ............. *B60K 35/00* (2013.01); *B60K 31/00* (2013.01); *B60K 31/0008* (2013.01); *B60K 31/042* (2013.01); *B60K 31/18* (2013.01); *B60K 37/06* (2013.01); *B60K 2350/1004* (2013.01); *B60Q 1/00* (2013.01); *B60Q 1/2665* (2013.01); *B60T 8/32* (2013.01); *F16H 63/00* (2013.01); *G01C 21/00* (2013.01)

(58) Field of Classification Search
CPC ...... B60Q 1/00; B60Q 1/2665; B60K 37/06; B60K 35/00; B60K 31/00; B60K 31/18; B60K 31/0008; B60K 2350/1004; B60K 31/042; G01C 21/00; B60T 8/32; F16H 63/00

See application file for complete search history.

(56) References Cited

U.S. PATENT DOCUMENTS

| | | | |
|---|---|---|---|
| 1,205,357 A | 11/1916 | Kloneck | |
| 4,102,191 A | 7/1978 | Harris | |
| 6,977,654 B2 | 12/2005 | Malik et al. | |
| 2002/0133285 A1* | 9/2002 | Hirasago | B60K 31/0008 701/96 |
| 2007/0273494 A1 | 11/2007 | Dittrich et al. | |
| 2008/0143505 A1* | 6/2008 | Maruyama | B60K 35/00 34/441 |
| 2013/0057400 A1* | 3/2013 | Dehmann | B60K 37/06 340/441 |

* cited by examiner

*Primary Examiner* — Behrang Badii
(74) *Attorney, Agent, or Firm* — Dickinson Wright PLLC

(57) ABSTRACT

A system and method for presenting a range via a graphical user interface (GUI) representing a gauge based on an operating parameter of a vehicle are provided. The system includes a speed receiver to receive the speed of the vehicle; a setting retriever to retrieve the range based on the operating parameter, the operating parameter being related to the speed; and a display driver to communicate the range to the GUI.

14 Claims, 4 Drawing Sheets

| SPEED 310 | ACCELERATION 320 | RANGE 330 | TIME 340 | CRUISE CONTROL 350 |
|---|---|---|---|---|
| 15 | X | 10-20 | X | NO |
| X | 20MPH/S | 0-100 | 1-5 SEC | NO |
| X | 2MPH/S | X-10, X+10 | X | NO |
| 60 | X | 55-65 | 10SEC | YES |

PRESENTING A DYNAMIC RANGE BASED ON AN OPERATING PARAMETER OF A VEHICLE

BACKGROUND

Information about a present state of a machine may be indicated via a display. For example, a sensor senses the speed of a vehicle, and provides an indication of the speed via a display. The display may be in various portions of the vehicle, for example, the cockpit, dashboard, or a heads-up display (HUD).

Conventionally, the gauges have been statically provided. The gauges often include painted numbers indicating various speed demarcations, hash marks, a pointer device, and a stepper motor attached to the pointer device. The stepper motor is controlled via a unit that indicates the speed of the vehicle in real-time. Thus, the speed of the vehicle is translated to the gauge in real-time via the pointer pointing at the closest speed indication.

FIGS. 1(a)-(c) illustrate various examples of a speed gauge 100 according to a conventional implementation. The speed gauge 100 includes various speed demarcations 110, (FIGS. 1a and b) a pointer 120, and (FIG. 1a) stepper motor 130 attached to a speed controller/sensor 140. As explained above, the speed controller 140 detects or receives an indication of speed from a vehicle (not shown), or a vehicular computing network (also not shown). The controller 140 controls the stepper motor 130 to transition the pointer 120 to the corresponding speed demarcation 110. In the conventional speed gauge 100, the display remains static.

FIG. 1(b) shows a linear gauge 100 that may be digitally rendered, or also be presented in an analog fashion.

FIG. 1(c) shows a numeric representation in lieu of a gauge 100. Essentially, a digital representation of a numeric value may be presented to a driver or operator of a vehicle. In the digital display implementation, a specific speed is shown. Thus, a range is not provided visually to the driver or operator of the vehicle.

SUMMARY

A system and method for presenting a range via a graphical user interface (GUI) representing a gauge based on an operating parameter of a vehicle are provided. The system includes a speed receiver to receive the speed of the vehicle; a setting retriever to retrieve the range based on the operating parameter, the operating parameter being related to the speed, and a display driver to communicate the range to the GUI.

DESCRIPTION OF THE DRAWINGS

The detailed description refers to the following drawings, in which like numerals refer to like items, and in which.

DETAILED DESCRIPTION

Figure 1A:
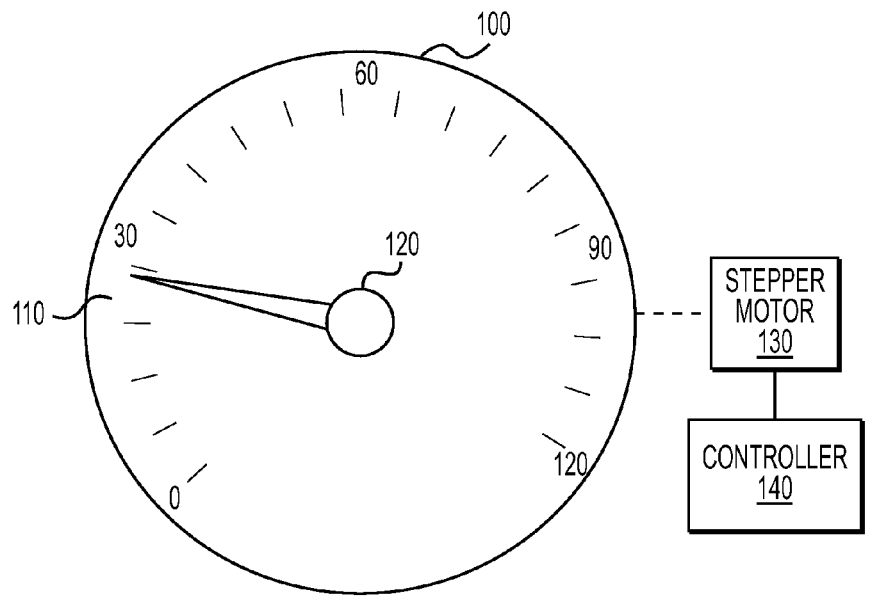
FIGS. 1(a)-(c) illustrate various examples of a speed gauge according to a conventional implementation.
Figure 1B:
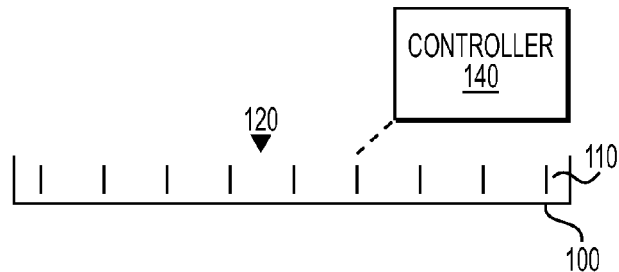
Figure 1C:
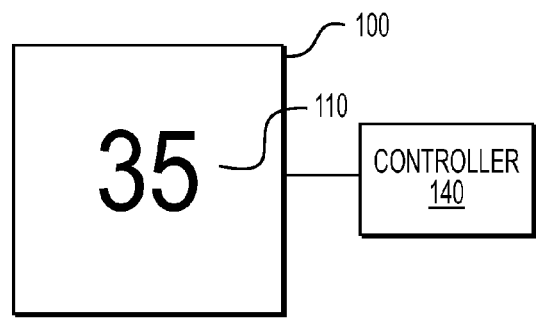

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Providing information to an operator or driver of vehicle allows the operator or driver to interact with the vehicle in a more robust manner. For example, when the information is speed (such as information provided via a speed gauge 100, as described above), the operator or vehicle may be cognizant of their current speed and adjust one's driving accordingly.

For example, if the operator or driver of the vehicle is in an area with a predefined speed limit, the operator or driver may ensure that the vehicle is within or under a range associated with the predefined speed limit.

However, due to the reality that conventional speed gauges show the range of speed in its entirety (for example, as shown in FIGS. 1(a) and (b) above), the operator or driver may find operating the vehicle at a specific speed to be difficult. For example, if the operator is attempting to maintain or keep the vehicle at 15 miles per hour (mph), this task may be made difficult due to the fact that the speed demarcations specifically around 15 mph may encompass a small percentage or portion of the speed gauge in its entirety.

In another situation, if the vehicle is in a state of acceleration a wider range may be desired. However, if the acceleration is gradual and relatively smaller (for example a delta from 15 mph to 20 mph), a smaller range may be desired. In either case, maintaining a static range may frustrate the experience in each mode of acceleration.

Disclosed herein are methods and systems for presenting a dynamic range via a graphical user interface (GUI) representing a gauge based on an operating parameter of a vehicle. In one example, the dynamic range may be presented via a digital display associated with a speedometer. In one example the operating parameter may be the present speed of the vehicle. In another example, the operating parameter may be a detected acceleration.

Thus, by employing the aspects disclosed herein, a range may be presented and dynamically changed base on an operation of a vehicle. Accordingly, in certain cases the operator or the driver may be able to operate the vehicle in a safer and more efficient manner. Often times, fuel efficiency is aided by an operator of a vehicle maintaining a specific or relatively constant speed. Thus, by having a range that is easier to read at a certain speed or operation, the operator of the vehicle may be aided in maintaining the speed.

Figure 2:
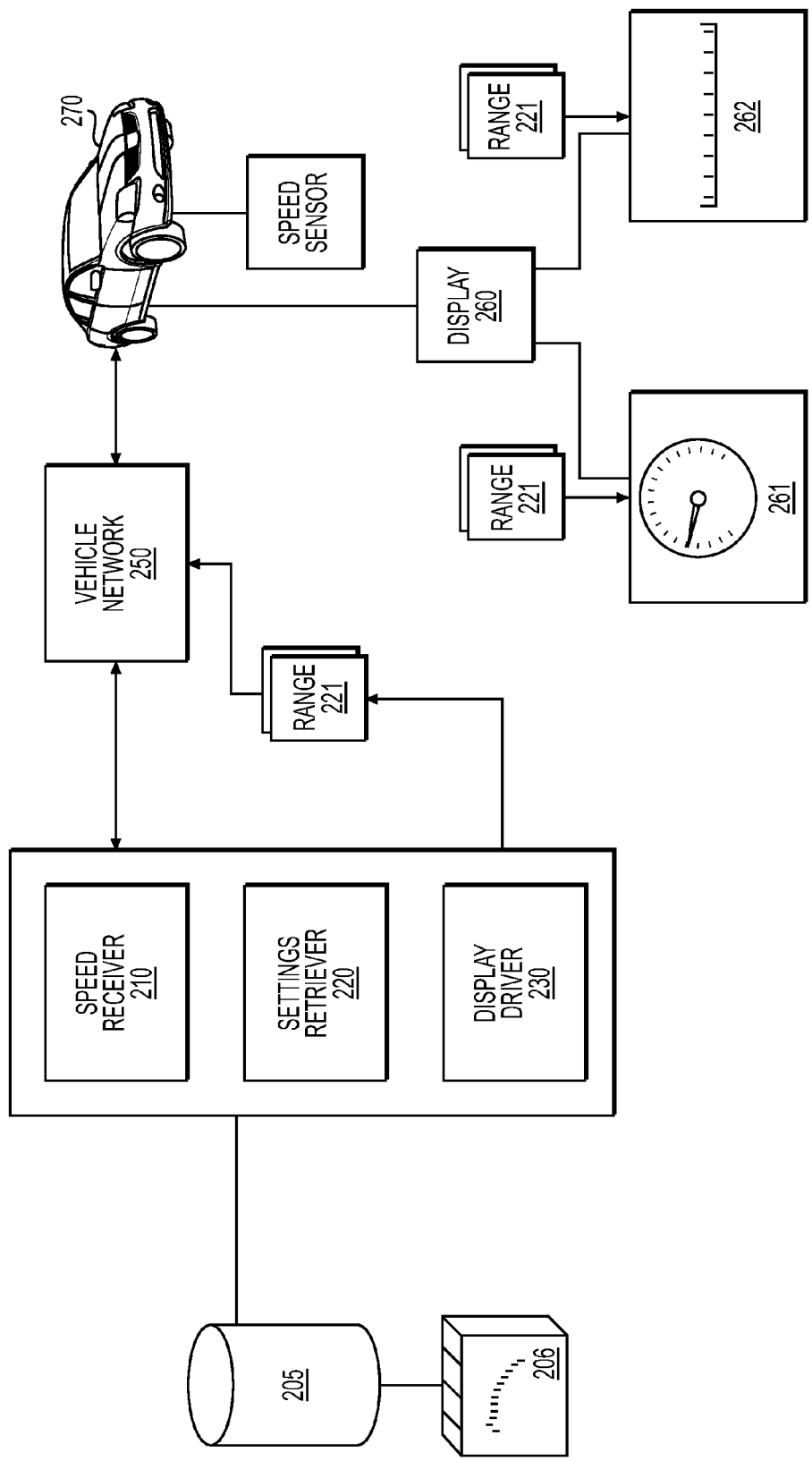
FIG. 2 is an example of a system for presenting a dynamic range via a graphical user interface (GUI) representing a gauge based on an operating parameter of a vehicle.

FIG. 2 is an example of a system 200 for presenting a dynamic range via a graphical user interface (GUI) representing a gauge based on an operating parameter of a vehicle 270. The system 200 includes a speed receiver 210, a settings retriever 220, and a display driver 230.

The system 200 may communicate to an existing display 260, via a wired or wireless network 250 situated in the vehicle 270. The display 260 may be a gauge, for example a speedometer gauge, and may be represented via various display configurations. As shown, display 260 may be represented via a radial display 261 or a linear display 262. In display 261 and 262, the ranges and numeric values associated with the demarcations on the displays may change and update accordingly based on the operations described below.

The system 200 may be implemented via a computer processor, or any integrated circuit (such as a non-volatile memory, a field programmable gate array, or the like) installed in a vehicle to augment the control of a display technology. The system 200 may be installed in a pre-existing processor or computer network situated an installed in the vehicle to control and interface with the various vehicle interfaces and operations.

The speed receiver 210 receives an indication of the present speed. The speed receiver 210 may be configured to communicate from a vehicle 270 sensor 271 via the network 250. The speed received 210 may be in constant communication with the sensor 271, and receive speed updates in real-time. Alternatively, a predetermined time may be set by an implementer of system 200. In another example, the speed receiver 210 may be configured to receive a speed reading by sensor 271 if the delta or change in speed from a previously received speed is over a predetermined threshold.

In another example, the speed receiver 210 may be configured to receive a present state of the vehicle 270. For example, if the vehicle 270 is in a state of acceleration (i.e. from pressing the gas pedal), or if the vehicle 270 is in a state of deceleration (i.e. from pressing the brake pedal), the speed receiver 210 may acknowledge this.

The settings retriever 220 retrieves a setting from a persistent store 205. The persistent store 205 may be preset by an installer or implementer of system 200. Alternatively, or in addition to, the setting may be configured by the driver or operator of vehicle 270.

Figures 3, 4:
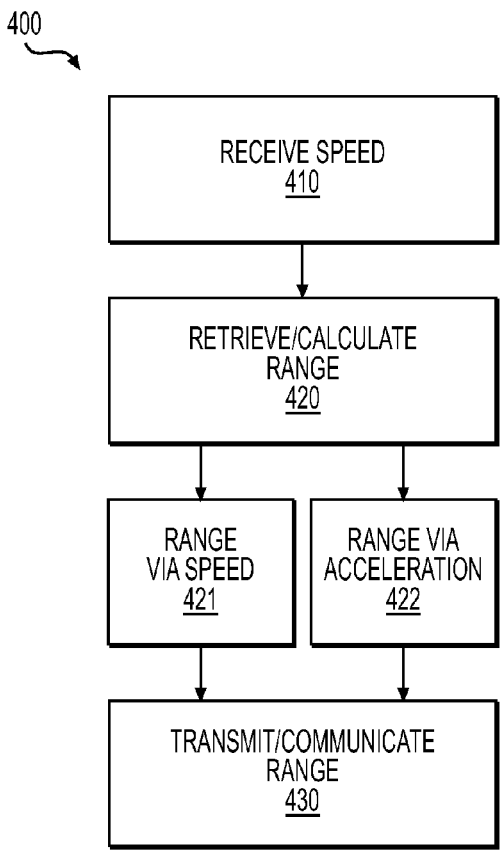
FIG. 3 illustrates an example lookup table according to an implementation of system shown in FIG. 2.
FIG. 4 illustrates an example of a method for presenting a dynamic range via a graphical user interface (GUI) representing a gauge based on an operating parameter of a vehicle.

FIG. 3 illustrates an example lookup table 206. The lookup table 206 contains various detected speeds or accelerations and the corresponding range 221. The range 221 is retrieved and temporarily stored, for example in a register or memory slot. The example shown in FIG. 3 is merely exemplary, with various combinations of speeds and ranges being employable and implementable.

Referring to FIG. 3, an example lookup table 206 is shown. The contents and the fields of the lookup table 206 may be in any form capable of being processed by system 200. The lookup table 206 in FIG. 3 includes several fields. The fields may be selectively incorporated in various combinations and configurations. Lookup table 206 includes a speed field 310, an acceleration field 320, a range field 330, a time field 340, a cruise control field 350.

The speed field 310 corresponds to the speed at which the vehicle 270 is operating at. Accordingly, if the speed matches the entry in field 310, the range field 330 corresponding with the speed field 310 is selected. The acceleration field 320 is similar to the speed field 310; however a present acceleration of the vehicle 270 is observed.

The time field 340 may be added to indicate that range associated with the corresponding range field 330 selected is to be presented for a specific and predefined time. Accordingly, the previous range displayed may be reverted to.

The cruise control field 350 indicates whether a cruise control (or in another example, another option associated with the operation of the vehicle) is asserted. Accordingly, range 221 presented may be contingent on the cruise control (or other option) being asserted or engaged with.

In another example, not shown, a field in the lookup table 206 may correspond to the present state of the vehicle 270. For example, if the state of the vehicle 270 is detected to be in a state of acceleration over a specific threshold (i.e. pressing on the gas pedal), the range 221 presented may be expanded and shown to be a specific amount (for example, 0-100 mph). Thus, the range 221 may dynamically be presented based on whether a state of acceleration or deceleration over a predefined threshold is detected.

The display driver 230 communicates the range 221 via network 250 to the display being implemented. The display driver 221 may transmit a specific value of the range 221, or alternatively, transmits a data file associated with a GUI of the new range.

The range 221 is displayed via the display 260. Accordingly, an installed or implemented range 221 corresponding to the vehicle 270's present implementation and speed may be displayed.

FIG. 4 illustrates a method 400 for presenting a dynamic range via a graphical user interface (GUI) representing a gauge based on an operating parameter of a vehicle. The method 400 may be implemented via a non-transitory computer readable medium, or alternatively, via a processor.

In operation 410, present speed of a vehicle is received. Similar to element 210, the speed received may be either in real-time, or at a predetermined interval or acceleration.

In operation 420, the range associated with the received speed or change in speed is retrieved or calculated. In one example (operation 421), the present speed is translated to a specific range. For example, if the speed is at 10-15 mph in a situation where a speed limit under 15 mph is mandated, the operator or driver of the vehicle may be aided by an expanded display of a smaller portion of the range of speeds.

In another example (operation 422), a detected acceleration may dictate the range shown. For example, if the vehicle is detected to be accelerating at a rate indicating the vehicle is on a freeway or similarly situated environment, the range may be expanded to show a larger and less granular amount. In another example, the range may be calculated via an algorithm based on the calculated acceleration.

Operations 421 and 422 may be provided individually, or alternatively, both may be provided in the same implementation.

In operation 430, the new range is transmitted or communicated to a display associated with the vehicle. After operation 430, the method 400 may return to operation 410 and await the receipt of a new speed as detected via an operation of a vehicle.

Figure 5A:
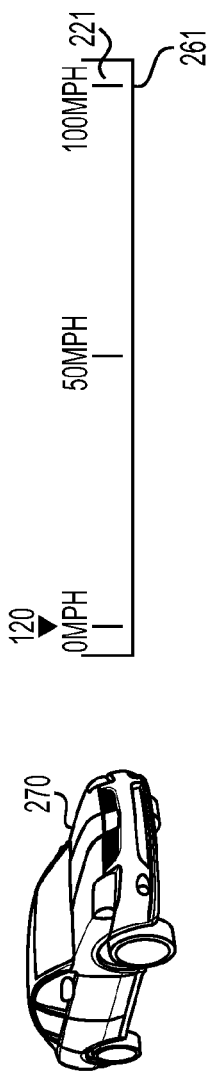
FIGS. 5(a) and 5(b) illustrate an example implementation of system shown in FIG. 2 or the method shown in FIG. 4.
Figure 5B:
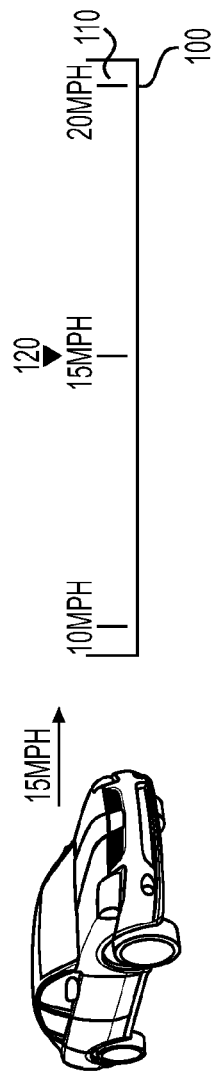

FIGS. 5(a) and 5(b) illustrate an example implementation of system 200 or method 400.

As shown in FIG. 5(a), a vehicle 270 is in a parked state. Accordingly, the speed shown is 0 mph. At this instance, after system 200 interfaces with a lookup table 206 (as shown in FIG. 3), the range 221 retrieved may be normal. A close-up look at display 260 indicates a full range is shown.

As shown in FIG. 5(b), the vehicle 270 is in motion, and travelling at 15 mph. Employing the aspects disclosed herein, system 200 retrieves a range 221 via lookup table 206. The range 221 is then communicated to display 260, which indicates a range of 10-20 mph. In both FIGS. 5(a) and 5(b), the same display 260 is employed; however, the speed demarcations are adjusted based on the configuration stored in lookup table 206.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for presenting a range via a graphical user interface (GUI) representing a gauge based on an operating parameter of a vehicle, comprising:
    a data store comprising a computer readable medium storing a program of instructions for the presenting of the range;
    a processor that executes the program of instructions;
    a speed receiver to receive the speed of the vehicle from a speed sensor of the vehicle;
    a setting retriever to retrieve the range based on the operating parameter, the operating parameter being a calculated acceleration from the received speed; and
    a display driver to communicate the range to GUI,
    wherein the range is digitally rendered onto a GUI of the speedometer to represent a lower limit and an upper limit of the speedometer, and speeds lesser and higher than speeds within the range are not displayed,
    the range being dynamically updated in response to the calculated acceleration changing, and the updated range being displayed as a same size as the range prior to updating on the GUI.

2. The system according to claim 1, wherein the operating parameter is directly related to the speed of the vehicle.

3. The system according to claim 1, wherein the operating parameter is related to the speed of the vehicle based on an option being engaged.

4. The system according to claim 3, wherein the option is a cruise control function.

5. The system according to claim 1, wherein the range reverts to a default range after a predetermined time has elapsed.

6. The system according to claim 1, wherein the setting retriever retrieves the range from a lookup table, the lookup table being configured by an implementer of the system.

7. The system according to claim 1, wherein the setting retriever retrieves the range from a lookup table, the lookup table being configured by a user of the system.

8. A method implemented via a processor for presenting a range via a graphical user interface (GUI) representing a gauge based on an operating parameter of a vehicle, comprising:
    receiving the speed of the vehicle from a speed sensor of the vehicle;
    retrieving the range based on the operating parameter, the operating parameter being a calculated acceleration from the received speed; and
    communicating the range to the GUI,
    wherein one of the receiving, the retrieving or the communicating is performed via the processor,
    the range is digitally rendered onto a GUI of the speedometer to represent a lower limit and an upper limit of the speedometer, and speeds lesser and higher than speeds with the range are not displayed,
    the range being dynamically updated in response to the calculated acceleration changing, and the updated range being displayed as a same size as the range prior to updating on the GUI.

9. The method according to claim 8, wherein the operating parameter is directly related to the speed of the vehicle.

10. The method according to claim 8, wherein the operating parameter is related to the speed of the vehicle based on an option being engaged.

11. The method according to claim 10, wherein the option is a cruise control function.

12. The method according to claim 8, wherein the range reverts to a default range after a predetermined time has elapsed.

13. The method according to claim 8, wherein the retrieving further comprises retrieving the range from a lookup table, the lookup table being configured by an implementer of the system.

14. The method according to claim 8, wherein the retrieving further comprises retrieving the range from a lookup table, the lookup table being configured by a user of the system.

* * * * *